US011411969B2

(12) United States Patent
Rosenberg (10) Patent No.: US 11,411,969 B2
(45) Date of Patent: Aug. 9, 2022

(54) LIVE PROCESS MIGRATION IN CONJUNCTION WITH ELECTRONIC SECURITY ATTACKS

(71) Applicant: Red Hat, Inc., Raleigh, NC (US)

(72) Inventor: Steven E. Rosenberg, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 402 days.

(21) Appl. No.: 16/693,519

(22) Filed: Nov. 25, 2019

(65) Prior Publication Data

US 2021/0160254 A1 May 27, 2021

(51) Int. Cl.
*H04L 29/06* (2006.01)
*H04L 9/40* (2022.01)
*G06F 9/48* (2006.01)

(52) U.S. Cl.
CPC ........ *H04L 63/1416* (2013.01); *G06F 9/4856* (2013.01); *H04L 63/20* (2013.01)

(58) Field of Classification Search
CPC ... H04L 63/1416; H04L 63/20; G06F 9/4856; G06F 9/5088
See application file for complete search history.

(56) References Cited

U.S. PATENT DOCUMENTS

| | | |
|---|---|---|
| 8,244,957 B2 | 8/2012 | Eidus et al. |
| 8,312,318 B2 | 11/2012 | Graham et al. |
| 8,873,375 B2 | 10/2014 | Kim et al. |
| 8,966,216 B1 | 2/2015 | Marshak et al. |
| 9,448,904 B2 | 9/2016 | Ishida et al. |
| 9,621,421 B1 | 4/2017 | Tolentino et al. |
| 9,626,272 B2 | 4/2017 | Heilper et al. |
| 9,712,503 B1* | 7/2017 | Ahmed ................ G06F 21/606 |
| 10,067,803 B2 | 9/2018 | Cropper et al. |
| 10,146,594 B2* | 12/2018 | Chao ................... G06F 9/45558 |
| 10,333,827 B2* | 6/2019 | Xu ...................... G06F 9/45558 |
| 10,339,016 B2 | 7/2019 | Juniwal et al. |
| 10,375,169 B1* | 8/2019 | Diallo ................. G06F 11/1484 |
| 10,684,909 B1* | 6/2020 | August ............... G06F 9/45533 |

(Continued)

FOREIGN PATENT DOCUMENTS

| | | | |
|---|---|---|---|
| CN | 103827823 A | 5/2014 | |
| CN | 103907092 A * | 7/2014 | ........... G06F 9/4856 |

(Continued)

OTHER PUBLICATIONS

Applicant-Initiated Interview Summary for U.S. Appl. No. 16/822,953, dated Aug. 31, 2021, 2 pages.

(Continued)

*Primary Examiner* — John B King
(74) *Attorney, Agent, or Firm* — Dority & Manning, P.A.

(57) ABSTRACT

Live process migration in conjunction with electronic security attacks. A determination is made to cause the initiation of a live migration of a process executing on a first computing device to a second computing device. Prior to causing the initiation of the live migration of the process, it is determined that the first computing device is undergoing an electronic security attack. In response to determining that the first computing device is undergoing the electronic security attack, the initiation of the live migration of the process is caused, or the determination to cause the initiation of the live migration of the process is reversed.

20 Claims, 7 Drawing Sheets

(56) References Cited

U.S. PATENT DOCUMENTS

| | | | |
|---|---|---|---|
| 2008/0196026 A1* | 8/2008 | Azagury | G06F 9/5088 718/100 |
| 2010/0332889 A1* | 12/2010 | Shneorson | G06Q 10/06 718/1 |
| 2011/0153798 A1* | 6/2011 | Groenendaal | H04L 63/20 713/153 |
| 2011/0320556 A1* | 12/2011 | Reuther | G06F 9/45558 709/213 |
| 2013/0238786 A1* | 9/2013 | Khesin | G06F 9/45533 709/224 |
| 2014/0130044 A1* | 5/2014 | Zhang | G06F 9/45533 718/1 |
| 2014/0195484 A1* | 7/2014 | Wang | G06F 11/1484 707/624 |
| 2014/0201533 A1* | 7/2014 | Kruglick | H04L 9/0825 713/171 |
| 2016/0188378 A1* | 6/2016 | Chao | G06F 9/5088 718/105 |
| 2016/0323098 A1* | 11/2016 | Bathen | G06F 9/45558 |
| 2017/0315838 A1 | 11/2017 | Nidugala et al. | |
| 2018/0032997 A1* | 2/2018 | Gordon | G06Q 30/0269 |
| 2018/0053001 A1* | 2/2018 | Folco | G06F 21/53 |
| 2018/0189087 A1* | 7/2018 | Palermo | H04L 67/142 |
| 2018/0246751 A1* | 8/2018 | Dong | G06F 9/45558 |
| 2018/0373553 A1* | 12/2018 | Connor | G06F 9/45558 |
| 2019/0087215 A1* | 3/2019 | Bhandari | G06F 9/45558 |
| 2019/0109901 A1 | 4/2019 | Zheng et al. | |
| 2019/0215332 A1* | 7/2019 | Kaplan | H04L 45/70 |
| 2019/0361746 A1 | 11/2019 | Schardt et al. | |
| 2020/0034221 A1 | 1/2020 | Ganesan et al. | |
| 2021/0019134 A1 | 1/2021 | Rusev et al. | |
| 2021/0049031 A1* | 2/2021 | Halcrow | G06F 21/552 |

FOREIGN PATENT DOCUMENTS

| | | | | |
|---|---|---|---|---|
| CN | 107247651 A | | 10/2017 | |
| CN | 109101322 A | * | 12/2018 | |
| CN | 104683388 B | | 2/2019 | |
| CN | 109783192 A | | 5/2019 | |
| CN | 110162379 A | | 8/2019 | |
| EP | 2782009 A1 | * | 9/2014 | G06F 11/301 |
| JP | 2015156150 A | * | 8/2015 | |
| JP | 2015156585 A | * | 8/2015 | |
| KR | 101856543 B1 | | 5/2018 | |

OTHER PUBLICATIONS

Amin, Zeeshan, et al., "Review on Fault Tolerance Techniques in Cloud Computing," International Journal of Computer Applications, vol. 116, Issue 18, Apr. 2015, pp. 11-17.

Engelmann, C., et al., "Proactive Fault Tolerance Using Preemptive Migration," International Conference on Parallel, Distributed and Network-based Processing, Feb. 2009, Weimar, Germany, IEEE, 6 pages.

Kochhar, Deepak, et al., "An Approach for Fault Tolerance in Cloud Computing Using Machine Learning Technique," International Journal of Pure and Applied Mathematics, vol. 117, Issue 22, 2017, pp. 345-351.

Ye, Kejiang, et al., "Fault Injection and Detection for Artificial Intelligence Applications in Container-Based Clouds," Nature, 2018, Springer International Publishing, pp. 112-127.

Final Office Action for U.S. Appl. No. 16/822,953, dated Dec. 7, 2021, 15 pages.

Chandrakala, B. et al., "Migration of Virtual Machine to improve the Security in Cloud Computing," International Journal of Electrical and Computer Engineering (IJECE), vol. 8, No. 1, Feb. 2018, Institute of Advanced Engineering and Science, pp. 210-219.

Non-Final Office Action for U.S. Appl. No. 16/822,953, dated Jun. 7, 2021, 12 pages.

* cited by examiner

LIVE PROCESS MIGRATION IN CONJUNCTION WITH ELECTRONIC SECURITY ATTACKS

BACKGROUND

Migrating a process from a source computing device to a target computing device may be done for any of a number of reasons. During the migration of a process, the source computing device, the target computing device, or both the source and target computing devices may be undergoing an electronic security attack.

SUMMARY

The examples disclosed herein continually monitor performance metrics of a plurality of computing devices, and, based on performance metric criteria, initiate live migration of processes from a source computing host that is deemed to be degraded, to a target computing host. Among other advantages, the examples thus eliminate or greatly reduce service disruption.

In one example, a method is provided. The method includes making a determination, by a processor device, to cause the initiation of a live migration of a first process executing on a first computing device to a second computing device. The method further includes, prior to causing the initiation of the live migration of the first process, determining, by the processor device, that the first computing device is undergoing an electronic security attack. The method further includes, in response to determining that the first computing device is undergoing the electronic security attack, causing the initiation of the live migration of the first process or reversing the determination to cause the initiation of the live migration of the first process.

In another example a computing device is provided. The computing device includes a memory and a processor device coupled to the memory. The processor device is to make a determination to cause the initiation of a live migration of a first process executing on a first computing device to a second computing device. The processor device is further to, prior to causing the initiation of the live migration of the first process, determine that the first computing device is undergoing an electronic security attack. The processor device is further to, in response to determining that the first computing device is undergoing the electronic security attack, cause the initiation of the live migration of the first process or reverse the determination to cause the initiation of the live migration of the first process.

In another example a computer program product is provided. The computer program product is stored on a non-transitory computer-readable storage medium and includes instructions to cause a processor device to make a determination to cause the initiation of a live migration of a first process executing on a first computing device to a second computing device. The instructions further to cause the processor device to, prior to causing the initiation of the live migration of the first process, determine that the first computing device is undergoing an electronic security attack. The instructions further to cause the processor device to, in response to determining that the first computing device is undergoing the electronic security attack, cause the initiation of the live migration of the first process or reverse the determination to cause the initiation of the live migration of the first process.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Computing environments today may include hundreds or thousands of host computing devices that implement thousands and thousands of different computing processes, each of which provides a service for some entity. It is inevitable that over time, host computing devices develop problems that may result in an immediate shutdown, such as when a memory chip goes bad or a processor device overheats and goes into a protective mode, or the problems may lead to degradation of service, such as when a host computing device is overloaded or when a computing device component is suffering problems that are not yet severe enough to completely halt the component but that result in compromised performance.

Once it is determined that a computing host cannot provide sufficient service, either because it has faulted or is degraded, the processes that provided services on the degraded computing host are initiated on another computing host. This process can involve a number of tasks, such as, by way of non-limiting example, identifying a suitable target computing host, moving data from the degraded computing host to the target computing host, and initiating the appropriate processes. In situations where the processes were providing real-time services to users, this may lead to a disruption in service and user dissatisfaction.

It may be possible to eliminate or reduce such problems by, for example, making a decision, based on real-time performance metric criteria for example, to initiate a live migration of processes from a source computing device to a target computing device. However, at times, the source computing device and/or the target computing device may be undergoing an electronic security attack. The term "electronic security attack" as used herein refers to actions of a malicious electronic actor, such as a computing device or a computer virus executing on a computing device that is intentionally attempting to damage, impede, spy on, obtain information from, or otherwise perform undesirable actions against a computing device.

In fact, in some circumstances, the electronic security attack may have led to the performance issues that resulted in the decision to initiate the live migration of the processes. Moreover, it may be undesirable to live migrate processes from a source computing device suffering performance problems to a target computing device undergoing an electronic security attack.

The examples disclosed herein, prior to causing the live migration of a process from a source computing device to a target computing device, determine whether the source computing device is undergoing an electronic security attack. If so, the electronic security attack is analyzed and the initiation of the live migration of the process(es) may continue, or may be reversed. Prior to the initiation of the live migration, the target computing device may also be analyzed to determine whether the target computing device is undergoing an electronic security attack, and if so, a different target computing device may be selected.

Figure 1:
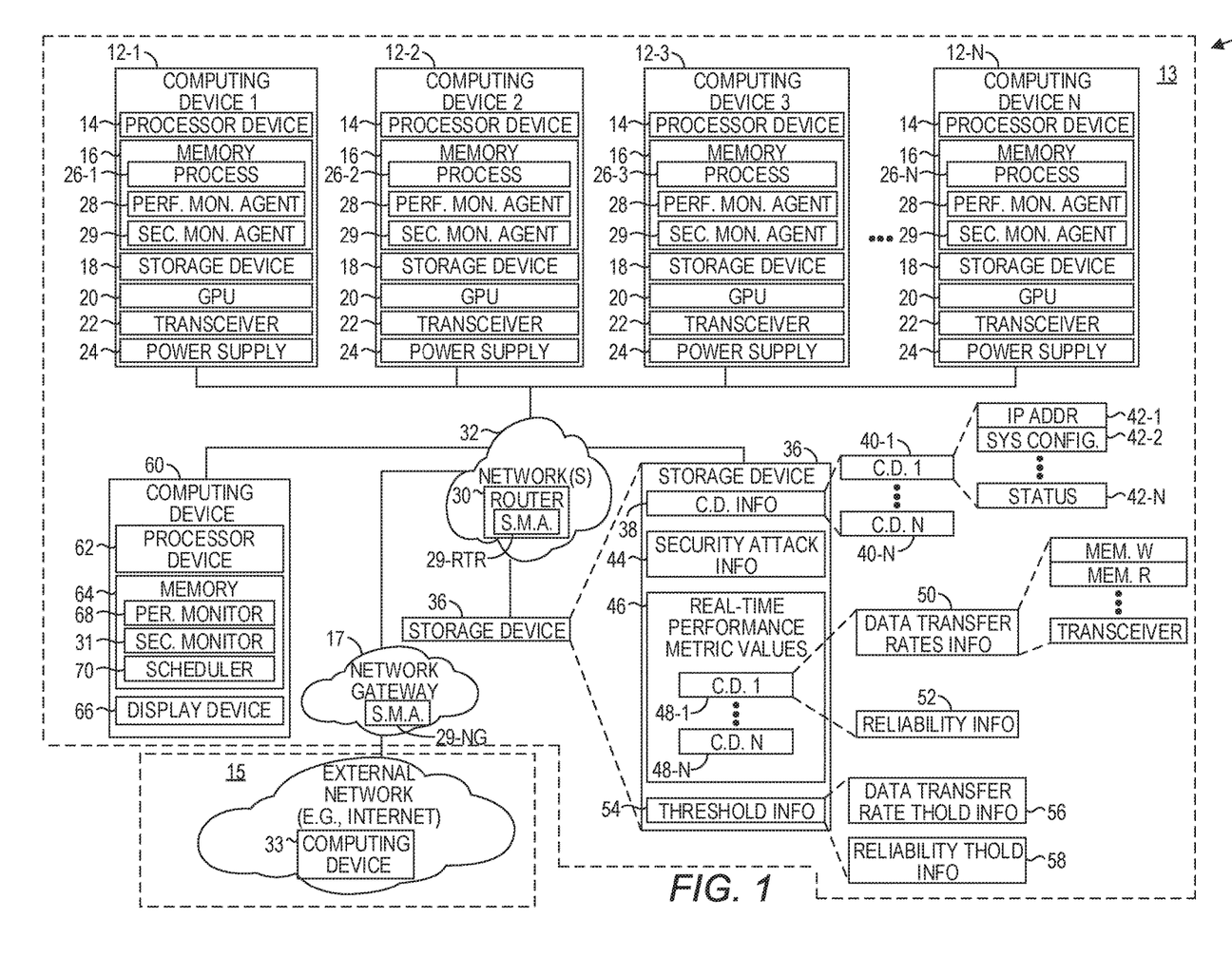
FIG. 1 is a block diagram of a system suitable for implementing process migration in response to real-time performance-based metrics according to one implementation.

FIG. 1 is a block diagram of a system 10 in which examples disclosed herein may be practiced. The system 10 includes a plurality of computing devices 12-1-12-N (generally, computing devices 12) that constitute a pool of computing devices 12 that provide services to one or more entities. There may be tens, hundreds or thousands of computing devices 12. In some implementations, the pool of computing devices 12 may be part of a cloud computing environment, either a private cloud computing environment or a third-party cloud computing environment that provides on-demand data processing series to different tenants (e.g., different customers). The computing devices 12 are part of a same internal network 13, and are separated from external networks 15 via one or more network gateway devices 17. For example, a subnet mask may be used to distinguish between IP addresses on the internal network 13 and the external networks 15. The network gateway device 17, for example, may translate external IP addresses known by devices in the external network 15 to internal IP addresses that correspond to the computing devices 12 that are unknown to the devices in the external network 15. In some implementations, the network gateway device 17 may maintain lists that identify each internal internet protocol (IP) address and/or media access control (MAC) address to distinguish devices on the internal network 13 from those on the external network 15.

The computing device 12-1 may include a number of electronic components, including, by way of non-limiting example, a processor device 14, a memory 16, a storage device 18, a graphics processing unit (GPU) 20, a transceiver 22 configured to communicate with a network, and a power supply 24. The computing device 12-1 also includes one or more processes 26 that provide services to some entity. The processes 26 may be any process. In some implementations, the processes 26 are virtual machines implemented through a virtualization technology, such as, by way of non-limiting example, VMware® virtualization technology or Kernel-based Virtual Machine (KVM) virtualization technology. Each of the computing devices 12-2-12-N may have similar electronic components 14, 16, 18, 20, 22, and 24 as described above with regard to the computing device 12-1. Solely for the purposes of illustration, the computing device 12-1 is illustrated as having a single process 26-1, and each of the computing devices 12-2-12-N may also have corresponding processes 26-2-26-N executing thereon. The processes 26-1-26-N may have identical functionality to one another, or completely different functionality. It will be appreciated that solely for purposes of illustration the computing devices 12 are illustrated as having a single process 26, but in actual practice, tens, hundreds or even thousands of processes may be concurrently executing on a single computing device 12.

The computing device 12-1 includes a performance monitor agent 28 that is configured to continuously obtain performance metric values that quantify corresponding performance metrics of the computing device 12-1. The performance monitor agent 28 may be a separate process or integrated into other processes of the computing device 12-1, such as an operating system of the computing device 12-1 or a virtual machine monitor of the computing device 12-1.

The computing device 12-1 also includes a security monitor agent 29 that is configured to continuously monitor the computing device 12-1 and provide security attack information relating to the computing device 12-1 to a centralized security monitor 31. In some embodiments, the security monitor agent 29 receives, from the centralized security monitor 31, known virus signatures and/or patterns. In some embodiments, the centralized security monitor 31 may obtain such known virus signatures and/or patterns from third party sources such as automated searches on the Internet, or from third party vendors, or the like. The monitoring may include both user layer and kernel layer monitoring.

The security monitor agent 29 may also analyze both the size of message payloads received by the computing device 12-1, and numbers of messages received by the computing device 12-1 by particular computing devices, including other computing devices 12-2-12-N and external computing devices 33 in the external network 15. The security monitor agent 29 may periodically, or intermittently, provide such information to the centralized security monitor 31. Such information may include, by way of non-limiting example, the detection of packets received by the computing device 12-1 that contain content that matches known virus signatures/patterns, detection of known virus signatures/patterns in the memory 16 of the computing device 12-1, information about the size, quantity and origination of packets received by the computing device 12-1 that meet some predetermined criteria, such as a quantity of packets over a predetermined amount of time, a predetermined size, and the like. The centralized security monitor 31 may store information received from the security monitor agent 29 in security attack information 44.

The security monitor agent 29 may, by way of non-limiting example, monitor both incoming and outgoing packets, monitor data sent between storage devices, monitor data at the operating system level and in kernel space for measuring driver activity to and from a network transceiver, storage devices, at the stack level, between CPU and memory, and the like.

In some implementations, the network gateway device 17 may also include a security monitor agent 29-NG that also monitors packets entering and exiting the internal network 13, and provide security attack information to the security monitor 31. In some implementations, the router 30 may also include a security monitor agent 29-RTR that also monitors packets being sent from one computing device 12 to another computing device 12, and provide security attack information to the security monitor 31.

The performance monitor agent 28 may obtain performance metric values by directly taking a suitable measurement, by obtaining the performance metric value from another process that takes such measurements, and/or by detecting certain events, such as faults or security attacks. The measurements may be taken at any desired interval. The interval may differ depending on the particular performance metric being measured. Such intervals may be, by way of non-limiting example, in milliseconds, in seconds, in minutes, or any other suitable interval.

The performance metrics, in some implementations, include data transfer rates of data communicated between electronic components. As an example, the performance monitor agent 28 may continuously measure a data transfer rate of data communicated between the processor device 14 and the memory 16. Additional non-limiting examples of suitable data transfer rates may be a data transfer rate of data communicated between the transceiver 22 and a router or switch 30 in a network 32; a data transfer rate of data communicated between the processor device 14 and the storage device 18; a data transfer rate of data communicated between the processor device 14 and the GPU 20; and a data transfer rate of data communicated between the GPU 20 and the memory 16.

The performance monitor agent 28 continuously stores, or causes to be stored, the obtained data transfer rates in a central storage device 36 for subsequent analysis, as described in greater detail below. The performance monitor agent 28 may send the obtained data transfer rates at the same interval they are obtained, or some other interval.

The performance metrics, in some implementations, may also be based on detected faults of the electronic components and or the age of the electronic components. The detected faults will vary depending on the particular electronic component but may include, by way of non-limiting example, memory faults of the memory 16, transceiver faults of the transceiver 22, power supply spikes or drops of the power supply 24, and read and write errors of the storage device 18. The performance monitor agent 28 continuously stores, or causes to be stored, the information that identifies the detected faults in the storage device 36, in which the obtained data transfer rates are stored for subsequent analysis, as described in greater detail below.

Each of the computing devices 12-2-12-N is configured similarly as described above with regard to the computing device 12-1. Each of the computing devices 12-2-12-N also include a performance monitor agent 28 that continuously obtains the real-time performance metrics and security attack information, as described above with regard for the computing device 12-1, for the corresponding computing device 12-2-12-N on which the respective performance monitor agent 28 executes. Each performance monitor agent 28 stores, or causes to be stored, the real-time performance metrics and security attack information in the storage device 36.

Each of the computing devices 12-2-12-N also include a security monitor agent 29 that is configured to periodically, intermittently, and/or in response to some criteria, provide security attack information relating to the corresponding computing device 12-2-12-N to the centralized security monitor 31, as described above with regard to the computing device 12-1.

The storage device 36 includes computing device (C.D.) information 38 associated with the computing devices 12. The computing device information 38 may include a plurality of records 40-1-40-N (generally, records 40), each of which corresponds to a respective computing device 12-1-12-N. Each record 40 may include, for example, an IP address 42-1 of the corresponding computing device 12; a system configuration 42-2 of the corresponding computing device 12 that identifies, for example, the amount of memory, the number of processors, the type of operating system, and any other suitable characteristics of the corresponding computing device 12; and a status 42-N that identifies a current status of the corresponding computing device 12, such as active, inactive, or the like.

The storage device 36 includes the security attack information 44 for each computing device 12-1-12-N, which identifies, for each computing device 12-1-12-N, the security attack information received by the security monitor 31 described above with regard to the computing device 12-1. The storage device 36 also includes real-time performance metric values 46 for each computing device 12-1-12-N, which comprises the real-time performance metrics received from the monitor agents 28. In one implementation, the real-time performance metric values 46 include a plurality of records 48-1-48-N (generally, records 48), each of which corresponds to a respective computing device 12-1-12-N. Each record 48 includes data transfer rates information 50 and reliability information 52. The data transfer rates information 50 contains the data transfer rates of data communicated between electronic components of the corresponding computing device 12 received from the corresponding performance monitor agent 28, as discussed above. As an example, the data transfer rates information 50 of the record 48-1 corresponds to the computing device 12-1, and may include a data transfer rate of data communicated between the processor device 14 and the memory 16, a data transfer rate of data communicated between the transceiver 22 and a router or switch 30 in the network 32, a data transfer rate of data communicated between the processor device 14 and the storage device 18, a data transfer rate of data communicated between the processor device 14 and the GPU 20, a data transfer rate of data communicated between the GPU 20 and the memory 16, and the like.

The reliability information 52 contains the information that identifies the detected faults of the electronic components of the corresponding computing device 12 received from the corresponding performance monitor agent 28, as discussed above, and, in some implementations, an age of the electronic component. As an example, the reliability information 52 of the record 48-1 corresponds to the computing device 12-1, and may include, by way of non-limiting example, an age of each electronic component, memory faults of the memory 16, transceiver faults of the transceiver 22, power supply spikes or drops of the power supply 24, read and write errors of the storage device 18, and the like.

The storage device 36 also includes threshold information 54 that identifies thresholds, in terms of numbers, ranges of numbers, or other information that, as described in greater detail below, is used to determine whether a live migration of a process 26 from one computing device 12 to another computing device 12 should be scheduled or initiated based on the data transfer rates information 50 stored in the records 48. The threshold information 54 may include, by way of non-limiting example, data transfer rate threshold information 56 that identifies suitable, or unsuitable, data transfer rates of data communicated between electronic components of the computing devices 12. The threshold information 54 may also include reliability threshold information 58 that identifies thresholds, in terms of numbers, ranges of numbers, or other information that, as described in greater detail below, is used to determine whether a live migration of a process 26 from one computing device 12 to another computing device 12 should be scheduled or initiated based on the reliability information 52 stored in the records 48.

The system 10 also includes a computing device 60, which in turn includes a processor device 62 communicatively coupled to a memory 64, and a display device 66. A performance monitor 68 executes in the memory 64. The performance monitor 68 periodically accesses the storage device 36 to obtain the real-time performance metric values 46 of the computing devices 12. The performance monitor 68 may obtain the real-time performance metric values 46 at any desired interval, such as every second, every minute or any other desired interval. The performance monitor 68 analyzes the real-time performance metric values 46, which includes the data transfer rate information 50 and the reliability information 52, in conjunction with the threshold information 54 to determine whether any of the real-time performance metric values 46 have undesirable values. If the performance monitor 68 determines that one or more of the real-time performance metric values 46 have undesirable values, the performance monitor 68 may make a determination to initiate a live migration of a process 26 executing on the computing device 12 from which the real-time performance metric values 46 were obtained, to another computing device 12.

The term "live migration", as used herein, refers to the copying of relevant portions of a process 26 from a source computing device 12 to a target computing device 12 while the process 26 continues to execute on the source computing device 12. The relevant portions of the process 26 may include, by way of non-limiting example, the portions of the memory 16 used by the process 26 and any data stored on a storage device 18 that is used by the process 26. After the relevant portions of the process 26 have been copied to the target computing device 12, the process 26 on the source computing device 12 may be briefly paused; any memory and/or data that was altered since the beginning of the live migration process may then be copied to the target computing device 12; and the process 26 may be reinitiated on the target computing device 12.

In some examples, the performance monitor 68 may cause the initiation of a live migration of a process 26 in conjunction with a scheduler 70. In particular, the performance monitor 68 may send a message to the scheduler 70 identifying the source computing device 12 and the target computing device 12. The scheduler 70 then determines the soonest time a live migration of the process 26 from the source computing device 12 to the target computing device 12 can be initiated.

If the computing device 60 makes a determination to cause the initiation of the live migration of the process 26 from the source computing device 12-1 to a target computing device 12, the security monitor 31 may, prior to the initiation of the live migration, analyze the security attack information 44 for both the source computing device 12-1 and the target computing device 12 to determine whether the source computing device 12-1 and the target computing device 12 is undergoing a security attack. Based on the analysis of the security attack information 44, the computing device 60 may proceed and cause the initiation of the live migration of the process 26 or may reverse the determination to cause the initiation of the live migration of the process 26, as discussed in greater detail below.

The security monitor 31 may analyze the security attack information 44 and categorize a type of security attack that is detected. As an example, one type of security attack may, for example, be an unknown attack pattern from an external computing device that is not part of the internal network 13, such as, for example, the computing device 33 in the external network 15. The security monitor 31 may categorize an attack as an unknown attack pattern from an external computing device based on one or more of the following criteria: the source addresses, such as MAC and/or IP addresses, are the same or from similar locations; the payload of the messages are the same or similar and of an unknown or non-useful nature; messages have an unknown form or utilize an unknown encryption; messages do not conform to white list patterns known messages are expected to have; and/or message sets enter from the same port, specific ports, sequentially, other patterns of port usage, or randomly when other patterns listed above are detected.

The security monitor 31 may categorize an attack as a known attack pattern from an external computing device based on one or more of the following criteria: the message sets contain payloads that match previously identified patterns of attacks whether the signatures have been reported by third parties or via the system by comparisons with internal black lists; patterns of behavior as to port usage, whether utilizing the same port, specific ports, sequential usage of multiple ports, other patterns of port usage forming a pattern or randomly; the source address or set of source addresses, such as the MAC or IP addresses, are black listed or from an unsupported or banned location; detection of redirection or address manipulation to establish actual point of origin; and/or messages containing encryption patterns known to be used in similar attacks that are not otherwise common.

The security monitor 31 may categorize an attack as an unknown attack pattern from an internal source, such as a computing device 12, based on one or more of the following criteria: detection of abnormally high data transfer for a given computing device 12 at the network level, between storage, processor device, non-uniform memory access (NUMA), memory, or the like, over a predetermined threshold; at the network level, where a high level of data transfer emanates from the internal computing device 12; the data transferred at any level are the same or similar and of an unknown or non-useful nature; the data transferred at any level have an unknown form or utilize an unknown encryption; the data transferred at any level do not conform to white list patterns known messages are expected to have; virus behavior detected on the computing device 12, such as those participating in the attack, those that cause anomalies that appear to be system failures, or the like; suspicious stack manipulation behavior resembling patterns of viral infection; and/or message sets at the network level are sent from the same port, specific ports, sequentially, other patterns of port usage or randomly when other patterns listed above are detected.

The security monitor 31 may categorize an attack as a known attack pattern from an internal source, such as a computing device 12 based on one or more of the following criteria: detection of abnormally high data transfer for a given host at the network level, between storage, between central processing unit (CPU), NUMA, memory, etc. past the given threshold with known patterns of an attack; the data sets being transferred contain payloads that match previously identified patterns of attacks whether the signatures have been reported by third parties or via the system by comparisons with internal black lists; at the network level, patterns of behavior as to port usage, whether utilizing the same port, specific ports, sequential usage of multiple ports, other patterns of port usage forming a pattern or randomly; at the network level, whether the destination address or set of destination addresses such as the MAC and/or IP addresses are black listed or from an unsupported or banned location if external addresses; data containing encryption patterns known to be used in similar attacks; the data transferred at any level do not conform to white list patterns known messages are expected to have; and/or suspicious stack manipulation behavior resembling patterns of viral infection.

If, after making a determination, by the computing device 60, to cause the initiation of a live migration of the process 26-1, the computing device 60 determines that the computing device 12-1 is undergoing an external security attack, the computing device 60 may, in some examples, reverse the determination to cause the initiation of the live migration of the process 26-1. Instead, the computing device 12-1 may take one or more actions to halt the external security attack, such as, by way of non-limiting example, causing messages to be quarantined and added to blacklists, fire alarms providing details of the security attack, and/or sending a notification to law enforcement authorities. The computing device 12-1 may block, by all firewalls and other security systems within the internal network 13, the set of source MAC and IP addresses for the set of messages associated with the security attack, and such MAC and IP addresses may be added to a blacklist of source addresses. These actions may both resolve the security attack and, in the case where undesirable performance metric values of the computing device 12-1 were the basis for deciding to initiate a live migration, cause such performance metric values to become desirable values.

If, after making a determination, by the computing device 60, to cause the initiation of a live migration of the process 26-1, the computing device 60 determines that the computing device 12-1 is undergoing an internal security attack, the computing device 60 may, in some examples, continue to cause the initiation of the live migration of the process 26-1 if the target computing device 12 is deemed not be undergoing a security attack. The computing device 60 may also cause the offending computing device 12 to be quarantined, as well as all other hosts deemed to be participating in the security attack. The computing device 60 may also cause the data sent by the offending computing device 12 to be quarantined, and the security attack analyzed may be documented. Any patterns of the security attack, such as signatures, may be added to blacklists. The processes running on the offending computing device 12 responsible for the security attack may be detected and disabled, and the data of the offending computing device 12 may be cleaned and removed from memory, including any hard drives, and the like. The computing device 60 may also cause all computing devices 12 to be scanned and/or inoculated to ensure the security attack is defeated.

As one example of live process migration in conjunction with electronic security attacks, assume that the computing device 60 determines that at least one performance metric value of the computing device 12-1 has an undesirable value, and based on this, makes a determination to cause the initiation of a live migration of the process 26-1 to a target computing device, such as the computing device 12-2. Prior to causing the live migration, the computing device 60 determines that the computing device 12-1 is undergoing an electronic security attack. The computing device 60 determines, based on the security attack information 44, that the computing device 33, located in the external network 15, is the originator of the electronic security attack. In response, the computing device 60 reverses the determination to cause the initiation of the live migration, and instead, performs one or more of the actions discussed above with regard to stopping an external security attack. In some implementations, this may include directing the network gateway 17 to refuse subsequent communications that originate from the computing device 33.

In another example, even after the computing device 60 determines that the computing device 12-1 is undergoing an external electronic security attack from the computing device 33, the computing device 60 may analyze the security attack information 44 associated with the computing device 12-2 to determine whether the computing device 12-2 is also undergoing an electronic security attack. If not, the computing device 60 may continue and cause the initiation of the live migration of the process 26-1 from the computing device 12-1 to the computing device 12-2.

In another example, assume that the computing device 60 determines that at least one performance metric value of the computing device 12-1 has an undesirable value, and based on this, makes a determination to cause the initiation of a live migration of the process 26-1 to a target computing device, such as the computing device 12-2. Prior to causing the live migration, the computing device 60 determines that the computing device 12-1 is undergoing an electronic security attack. The computing device 60 determines, based on the security attack information 44, that the security attack is originating on the computing device 12-1. In particular, the computing device 60 determines that the attack is coming from another process executing on the computing device 12-1, and not from the process 26-1. In response, the computing device 60 causes the initiation of the live migration of the process 26-1 from the computing device 12-1 to the computing device 12-2.

In some examples, prior to causing the live migration of the process 26-1 from the computing device 12-1 to the computing device 12-2, the computing device 60 determines that the computing device 12-2 is not undergoing an electronic security attack.

In another example, the computing device 60 may determine that the process 26-1 is the cause of the security attack. In response, the computing device 60 reverses the determination to cause the initiation of the live migration, and instead, performs one or more of the actions discussed above with regard to stopping an internal security attack.

It is noted that while, solely for purposes of illustration, the performance monitor 68, the security monitor 31 and the scheduler 70 are shown as components of the same computing device, in practice, each such component could be implemented on a separate computing device.

Figure 2:
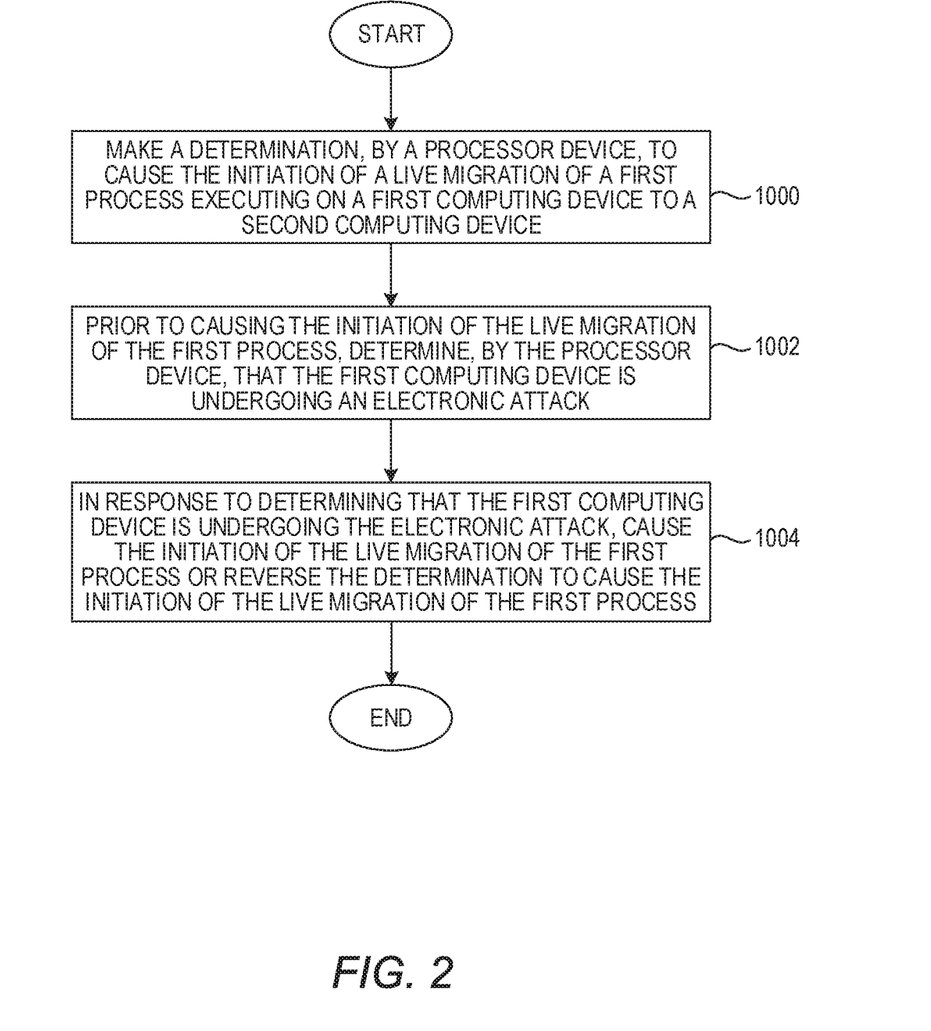
FIG. 2 is a flowchart of a method for live process migration in conjunction with electronic security attacks according to one implementation.

FIG. 2 is a flowchart of a method for live process migration in conjunction with electronic security attacks according to one implementation. The computing device 60 makes a determination to cause the initiation of a live migration of the process 26-1 executing on the computing device 12-1 to the computing device 12-2 (FIG. 1, block 1000). Prior to causing the initiation of the live migration of the process 26-1, the computing device 60 determines that the computing device 12-1 is undergoing an electronic security attack (FIG. 1, block 1002). In response to determining that the computing device 12-1 is undergoing the electronic security attack, the computing device 60 causes the initiation of the live migration of the process 26-1 or reverses the determination to cause the initiation of the live migration of the process 26-1 (FIG. 1, block 1004).

Figure 3:
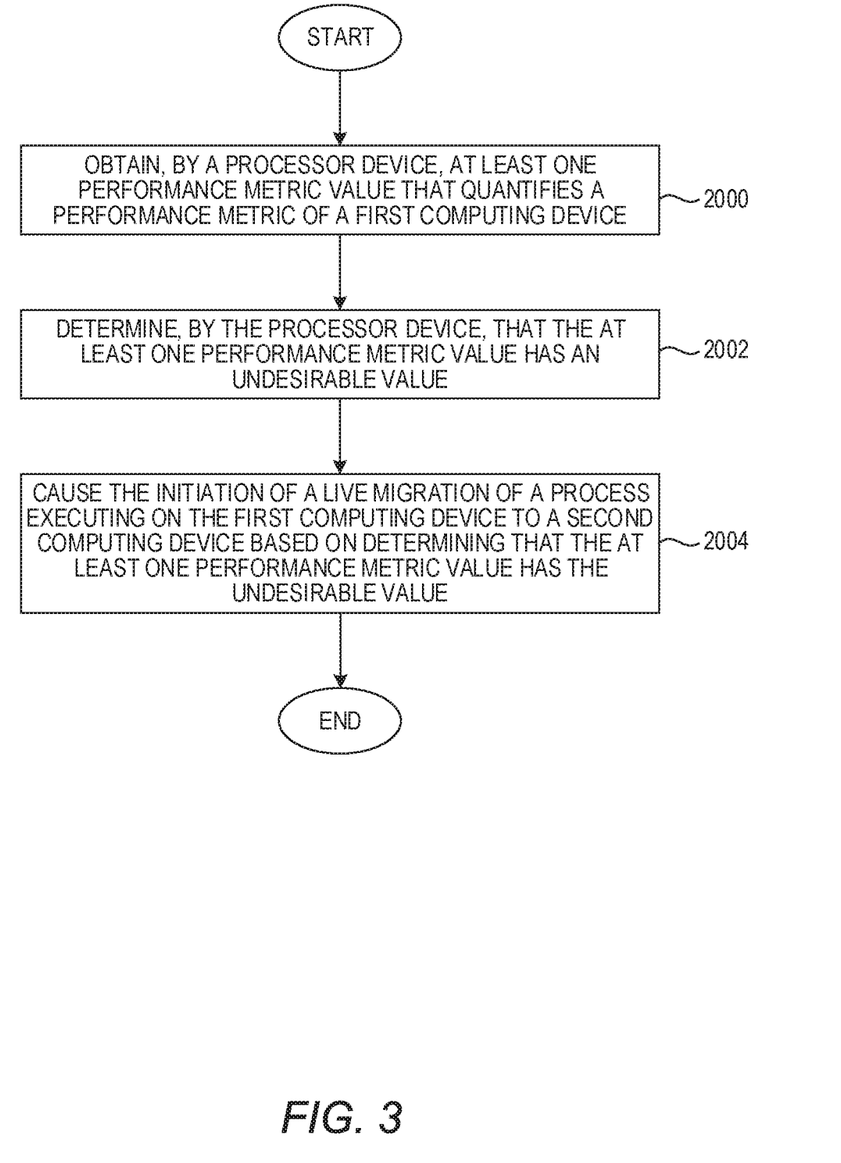
FIG. 3 is a flowchart of a method for process migration in response to real-time performance-based metrics according to one example.

While the examples disclosed herein have applicability in any context in which it is decided to initiate a live migration of a process from one computing device to another computing device, in some implementations, the determination to initiate the live migration may be based on real-time performance metrics of the computing devices 12. In this regard, FIG. 3 is a flowchart of a method for process migration in response to real-time performance-based metrics according to one example. FIG. 3 will be discussed in conjunction with FIG. 1. The performance monitor 68 obtains at least one performance metric value 46 that quantifies a performance metric of the computing device 12-1 (FIG. 3, block 2000). The performance monitor 68 determines that the at least one performance metric value 46 has an undesirable value (FIG. 3, block 2002). Assuming that there is no ongoing security attack, or, that the computing device 60 has determined that the live migration should be initiated despite an ongoing security attack, the performance monitor 68 causes the initiation of a live migration of the process 26-1 executing on the computing device 12-1 to the computing device 12-2 based on determining that the at least one performance metric value 46 has the undesirable value (FIG. 3, block 2004). The performance monitor 68 may cause the initiation of the live migration directly by initiating the live migration, or by, for example, sending a message to the scheduler 70 identifying the source computing device 12 and the target computing device 12. The scheduler 70 then determines the soonest time a live migration of the process 26 from the source computing device 12 to the target computing device 12 can be initiated.

It is noted that, because the performance monitor 68 is a component of the computing device 60, functionality implemented by the performance monitor 68 may be attributed to the computing device 60 generally. Moreover, in examples where the performance monitor 68 comprises software instructions that program the processor device 62 to carry out functionality discussed herein, functionality implemented by the performance monitor 68 may be attributed herein to the processor device 62.

Similarly, it is noted that, because the security monitor 31 is a component of the computing device 60, functionality implemented by the security monitor 31 may be attributed to the computing device 60 generally. Moreover, in examples where the security monitor 31 comprises software instructions that program the processor device 62 to carry out functionality discussed herein, functionality implemented by the security monitor 31 may be attributed herein to the processor device 62.

Figure 4:
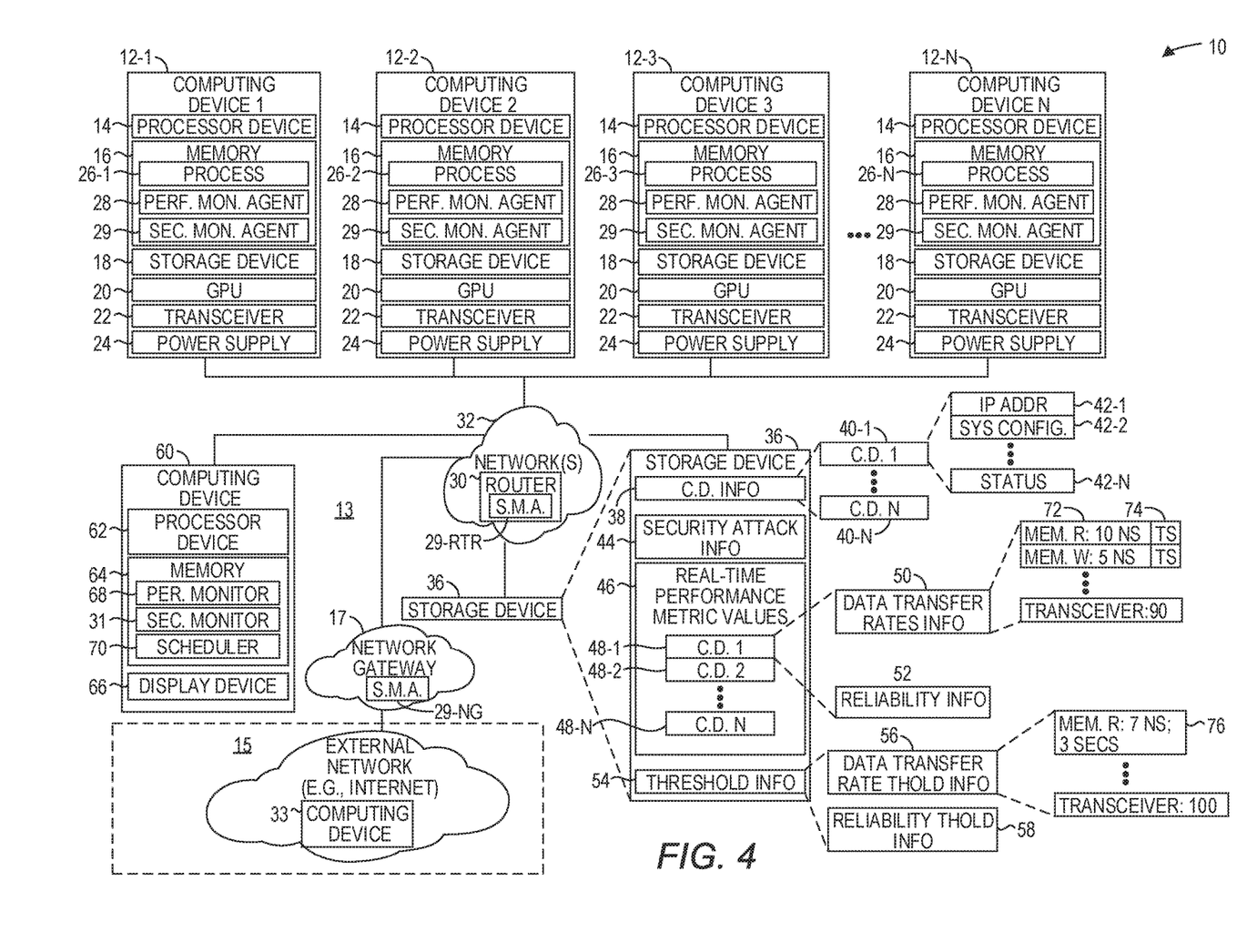
FIG. 4 is a block diagram of the system illustrated in FIG. 1, illustrating the use of a data transfer rate real-time performance metric value as a basis for initiating a live migration of a process according to one example.

FIG. 4 is a block diagram of the system 10 illustrating the use of a data transfer rate real-time performance metric value as a basis for initiating a live migration of a process according to one example. Assume for purposes of illustration that the performance monitor agent 28 of the computing device 12-1 periodically, such as each second, obtains performance metric values that include a read time value that identifies an amount of time between the time the processor device 14 of the computing device 12-1 requests data from the memory 16 of the computing device 12-1 and the time the processor device 14 receives the data. In this example, the memory read time is 10 nanoseconds. The performance monitor agent 28 sends the memory read time to the storage device 36, where it is stored in a memory read time field 72 of the data transfer rates information 50 of the record 48-1 that corresponds to the computing device 12-1. The performance monitor agent 28 may also send a timestamp in conjunction with the memory read time that identifies the time that the memory read time was measured. The timestamp may be stored in a timestamp field 74 of the data transfer rates information 50.

The performance monitor 68 continuously accesses the records 48-1-48-N and analyzes any new performance metric values contained in such records. The performance monitor 68 may, for example, use corresponding timestamps to determine whether the performance metric value has been previously obtained by the performance monitor 68. The performance monitor 68 accesses the memory read time field 72 of the data transfer rates information 50 of the record 48-1. The performance monitor 68 also accesses a memory read threshold value 76 identified in the data transfer rate threshold information 56 of the threshold information 54. The memory read threshold value 76 is 7. In this example, the value 7 identifies a maximum memory read threshold value, and any value over the maximum memory read threshold value is undesirable. The memory read time field 72 contains a value of 10, and thus the performance monitor 68 determines that the memory read time field 72 contains an undesirable value, and thus that the process 26-1 should be live migrated to another computing device 12. The performance monitor 68 may also utilize the timestamps in the timestamp fields 74 of successive entries in conjunction with threshold values.

The performance monitor 68 then selects another computing device 12 as a target computing device 12 to which the process 26-1 will be live migrated. Each of the computing devices 12-2-12-N may be potential target computing devices 12. In some examples, the performance monitor 68 may analyze the performance metric values contained in one or more of the records 48-2-48-N and select a particular computing device 12, such as the computing device 12-2 as the target computing device 12 based on the performance metric values contained in the records 48-2-48-N. In some implementations, the performance monitor 68 may utilize additional factors to select a target computing device 12, such as a current load of each of the computing devices 12-2-12-N. In particular, the performance monitor 68 may determine which of the computing devices 12-2-12-N has the least load based on some criteria, such as, by way of non-limiting example, processor usage, memory usage, and/or number of processes 26 executing on the computing devices 12-2-12-N. The performance monitor 68 may then access the record 48 that corresponds to such computing device 12, and if performance metric values are all desirable values, select such computing device 12 as the target computing device 12.

It should be noted that, in some implementations, the threshold information 54 may include not only an undesirable value, but a minimum length of time that the performance metric value must be undesirable. For example, the memory read threshold value 76 may be accompanied with a time, such as 3 seconds. The performance monitor 68 may then first ensure, such as via the timestamp fields 74 that store the timestamps that have accompanied successive memory read times of the computing device 12-1, that the memory read time values have been undesirable values for more than three seconds prior to selecting a target computing device 12 and initiating a live migration of the process 26-1.

Figure 5:
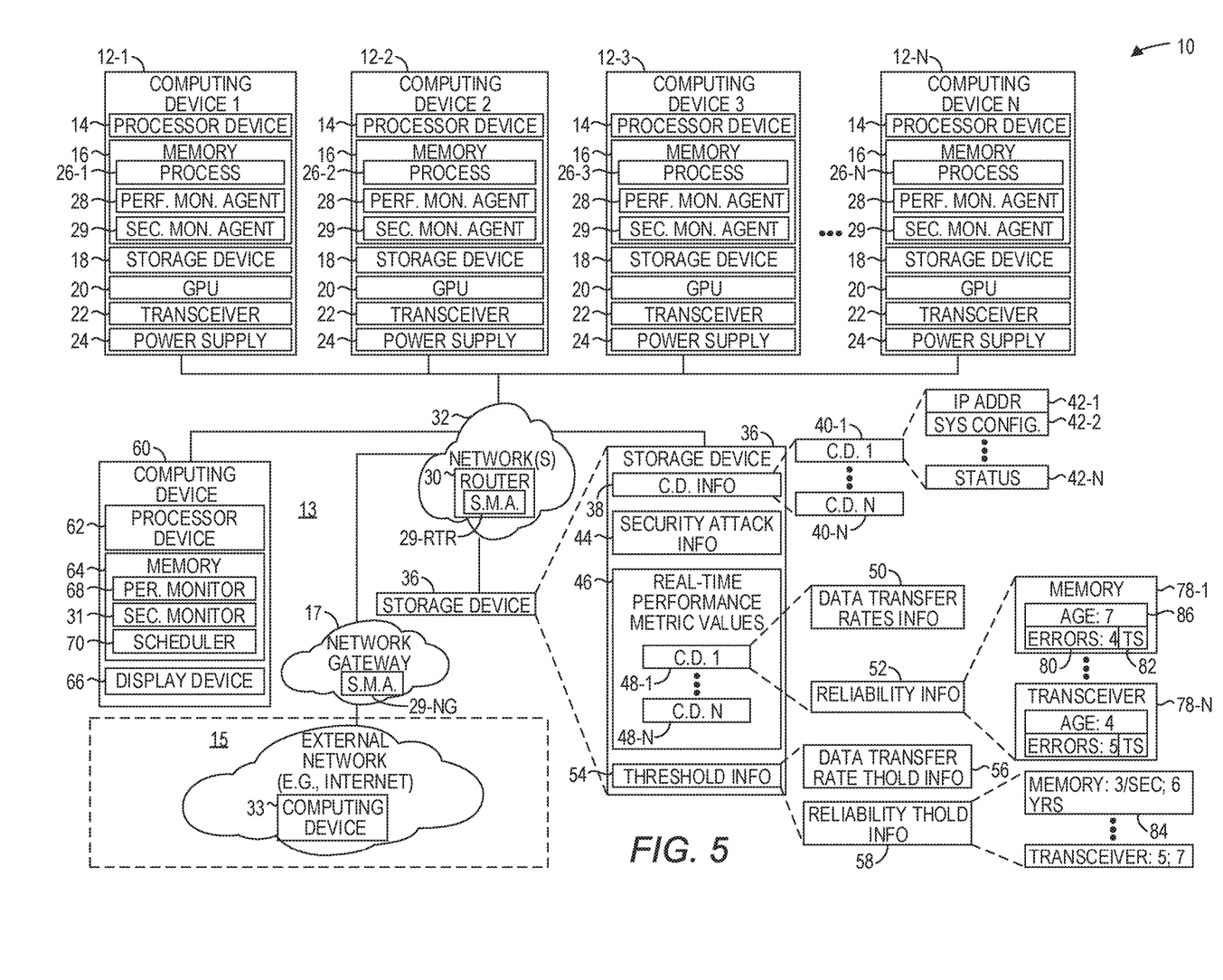
FIG. 5 is a block diagram of the system illustrated in FIG. 1, illustrating the use of reliability metric values as a basis for initiating a live migration of a process according to one example.

FIG. 5 is a block diagram of the system 10 illustrating the use of reliability metric values as a basis for initiating a live migration of a process according to one example. As noted above, the reliability information 52 contains the information that identifies the detected faults of the electronic components of the corresponding computing device 12 received from the corresponding performance monitor agent 28, as discussed above, and, in some implementations, an age of the electronic component. As an example, the reliability information 52, which corresponds to the computing device 12-1, includes a record 78-1 that identifies an age of the memory 16 of the computing device 12-1 and a fault, or error, count of errors encountered by the memory 16 over a period of time, such as seconds, minutes, or any other predetermined interval. Similarly, the reliability information 52 includes a record 78-N that identifies an age of the transceiver 22 of the computing device 12-1 and a fault, or error, count of errors encountered by the transceiver 22 over a period of time, such as seconds, minutes, or any other predetermined interval.

Assume again for purposes of illustration that the performance monitor agent 28 of the computing device 12-1 periodically, such as each second, obtains performance metric values that include an error rate of the memory 16 of the computing device 12-1 over some period of read time, such as seconds. In this example, the error rate is 4 per second. The performance monitor agent 28 sends the memory error rate to the storage device 36, where it is stored in a memory error rate field 80 of the record 78-1. The performance monitor agent 28 may also send a timestamp in conjunction with the memory error rate that identifies the time that the memory error rate was obtained. The timestamp may be saved in a timestamp field 82 of the record 78-1.

The performance monitor 68 continuously accesses the records 48-1-48-N and analyzes any new performance metric values contained in such records. The performance monitor 68 may, for example, use corresponding timestamps to determine whether the performance metric value has been previously obtained by the performance monitor 68. The performance monitor 68 accesses the record 78-1. The performance monitor 68 also accesses a memory error rate threshold value 84 identified in the reliability threshold information 58 of the threshold information 54. The memory error rate threshold value 84 is 3. In this example, the value 3 identifies a maximum memory error rate value per second, and any value over the maximum memory error rate value is undesirable. The memory error rate field 80 contains the value 4, and thus the performance monitor 68 determines that the memory error rate value in the memory error rate field 80 is an undesirable value, and thus that the process 26-1 should be live migrated to another computing device 12.

The performance monitor 68 then selects another computing device 12 as a target computing device 12 to which the process 26-1 will be live migrated, as discussed above with regard to FIG. 3. After selecting the target computing device 12, the performance monitor 68 initiates a live migration of the process 26-1 to the target computing device 12. In some examples, the performance monitor 68 may initiate the live migration via the scheduler 70.

In some implementations, the performance monitor 68 may use an age of the electronic component as a basis for live migration, either alone, or in conjunction with an error rate. For example, the memory error rate threshold value 84 may also be accompanied by a threshold age, which, in this example, is 3 years. The performance monitor 68 may utilize both criteria: the actual memory error rate and the age of the memory 16, prior to determining to live migrate the process 26-1 to the target computing device 12. In this example, the record 78-1 includes an age field 86, which identifies the age of the memory 16 as 7 years old. The performance monitor 68 determines that both criteria have undesirable values, because the age of 7 years is greater than the threshold age of 6, and the memory error rate of 4 is greater than the memory error rate threshold value 84 of 3.

It is noted that, similar to the discussion above with regard to FIG. 3, in some implementations, the memory error rate threshold value 84 may not only contain a threshold value, but also a number of successive occurrences by which the memory error rate threshold value 84 must be exceeded prior to the initiation of a live migration. For example, it may be required that the memory error rate threshold value 84 be exceeded for 5 successive occurrences.

In some implementations, the reliability threshold information 58 may contain a table that identifies a maximum per age of the electronic component. For example, for the memory 16, the reliability threshold information 58 may indicate that for a 1 year old memory 16, 2 errors per second is the threshold; for a 2 year old memory 16, 4 errors per second is the threshold; for a 3 year old memory 16, 6 errors per second is the threshold; and the like.

In some implementations, the performance monitor 68, prior to initiating a live migration of the process 26-1, may communicate with the security monitor 31 to determine whether the computing device 12-1 is undergoing a security attack, which may be the cause of the undesirable performance metric values. For example, the security attack may involve flooding the computing device 12-1 with packets via the network 32, causing the computing device 12-1 to be overloaded processing such packets. In such events, rather than initiate the live migration in response to the identification of an undesirable performance metric value, the performance monitor 68 may send an alert or other message to the display device 66 identifying the undesirable performance metric value, and the decision not to initiate a live migration, to thereby allow an operator to either resolve the security attack, or manually initiate a live migration.

Figure 6:
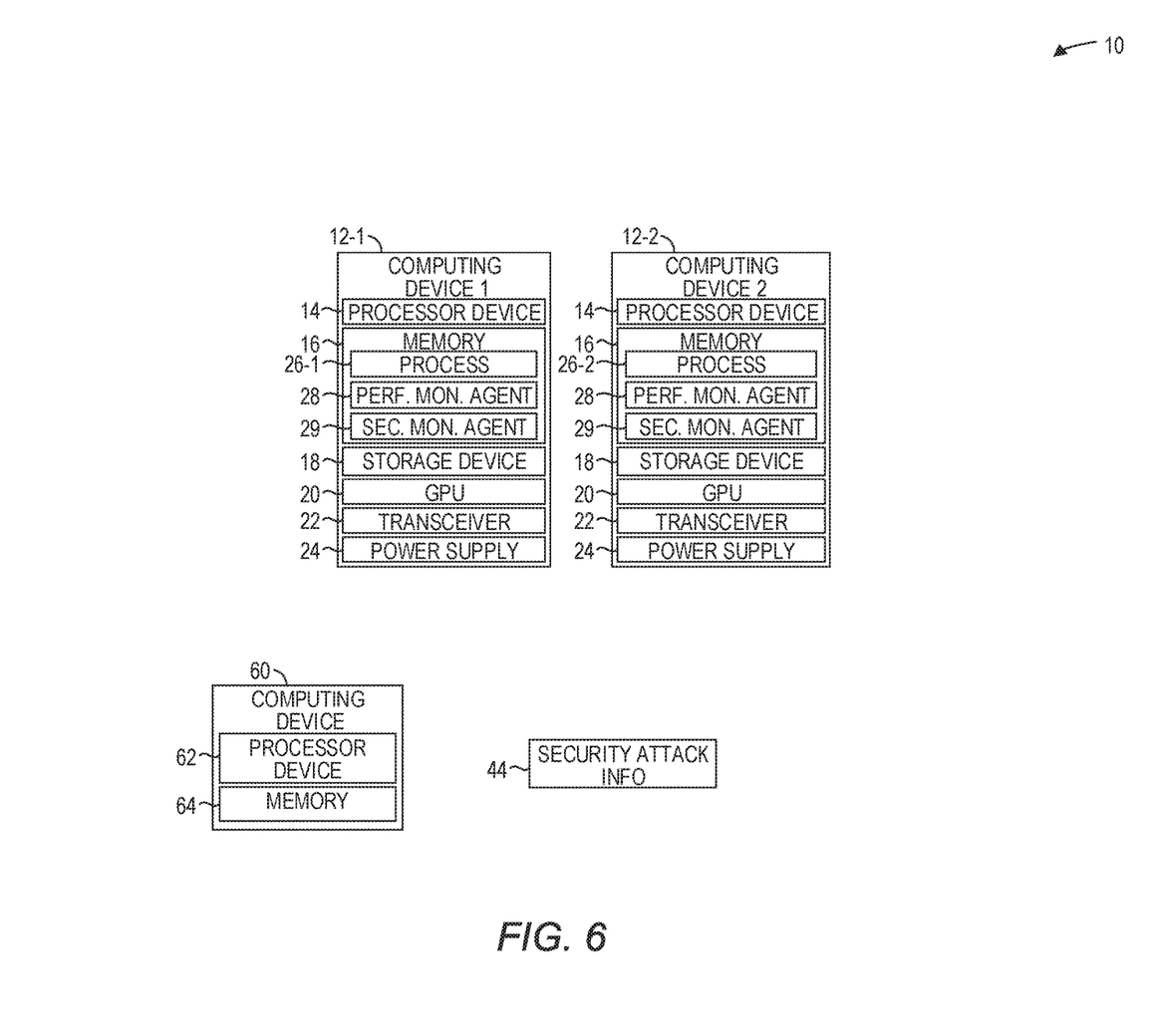
FIG. 6 is a simplified block diagram of the system illustrated in FIG. 1 according to one implementation.

FIG. 6 is a simplified block diagram of the system 10 illustrated in FIG. 1 according to one implementation. The system 10 includes the computing device 60, which in turn includes the memory 64 and the processor device 62, which is communicatively coupled to the memory 64. The processor device 62 is to make a determination to cause the initiation of a live migration of the process 26-1 executing on the computing device 12-1 to the computing device 12-2, for example. Prior to causing the initiation of the live migration of the process, the processor device 62 is to determine that the computing device 12-1 is undergoing an electronic security attack. In response to determining that the computing device 12-1 is undergoing the electronic security attack, the processor device 62 is to cause the initiation of the live migration of the process 26-1 or reverse the determination to cause the initiation of the live migration of the process 26-1.

Figure 7:
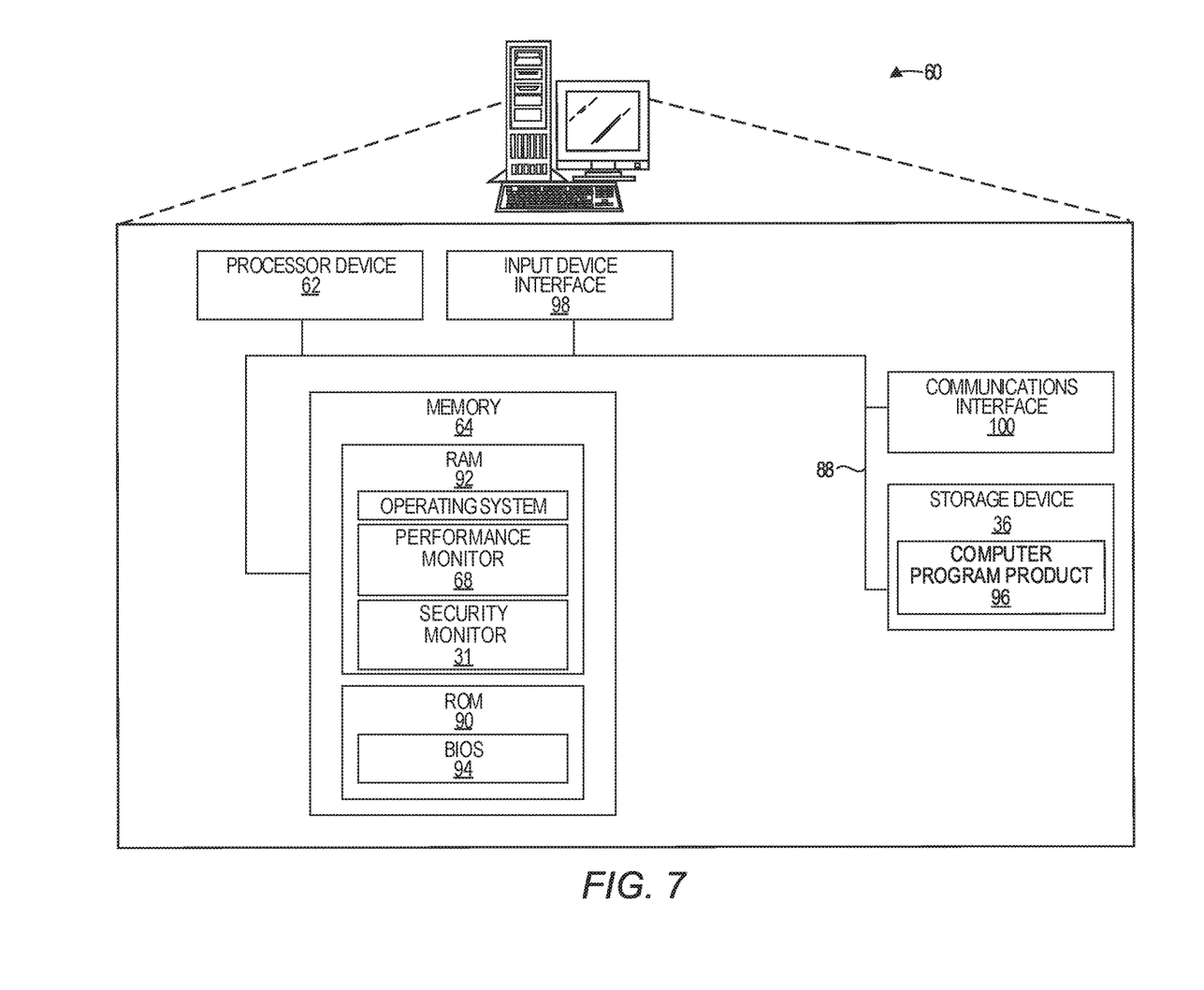
FIG. 7 is a block diagram of a computing device suitable for implementing examples according to one example.

FIG. 7 is a block diagram of the computing device 60 suitable for implementing examples according to one example. The computing device 60 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 60 includes the processor device 62, the system memory 64, and a system bus 88. The system bus 88 provides an interface for system components including, but not limited to, the system memory 64 and the processor device 62. The processor device 62 can be any commercially available or proprietary processor.

The system bus 88 may be any of several types of bus structures that may further interconnect to a memory bus (with or without a memory controller), a peripheral bus, and/or a local bus using any of a variety of commercially available bus architectures. The system memory 64 may include non-volatile memory 90 (e.g., read-only memory (ROM), erasable programmable read-only memory (EPROM), electrically erasable programmable read-only memory (EEPROM), etc.), and volatile memory 92 (e.g., random-access memory (RAM)). A basic input/output system (BIOS) 94 may be stored in the non-volatile memory 90 and can include the basic routines that help to transfer information between electronic components within the computing device 60. The volatile memory 92 may also include a high-speed RAM, such as static RAM, for caching data.

The computing device 60 may further include or be coupled to a non-transitory computer-readable storage medium such as the storage device 36, which may comprise, for example, hard disk drive (HDD) (e.g., enhanced integrated drive electronics (EIDE) or serial advanced technology attachment (SATA)), HDD (e.g., EIDE or SATA) for storage, flash memory, or the like. The storage device 36 and other drives associated with computer-readable media and computer-usable media may provide non-volatile storage of data, data structures, computer-executable instructions, and the like.

A number of modules can be stored in the storage device 36 and in the volatile memory 92, including an operating system and one or more program modules, such as the performance monitor 68 and/or the security monitor 31, which may implement the functionality described herein in whole or in part. All or a portion of the examples may be implemented as a computer program product 96 stored on a transitory or non-transitory computer-usable or computer-readable storage medium, such as the storage device 36, which includes complex programming instructions, such as complex computer-readable program code, to cause the processor device 62 to carry out the steps described herein. Thus, the computer-readable program code can comprise software instructions for implementing the functionality of the examples described herein when executed on the processor device 62. The processor device 62, in conjunction with the performance monitor 68 and/or the security monitor 31 in the volatile memory 92, may serve as a controller, or control system, for the computing device 60 that is to implement the functionality described herein.

An operator may also be able to enter one or more configuration commands through a keyboard, a pointing device such as a mouse (not illustrated), or a touch-sensitive surface such as the display device 66. Such input devices may be connected to the processor device 62 through an input device interface 98 that is coupled to the system bus 88 but can be connected by other interfaces such as a parallel port, an Institute of Electrical and Electronic Engineers (IEEE) 1394 serial port, a Universal Serial Bus (USB) port, an IR interface, and the like.

The computing device 60 may also include a communications interface 100, such as an Ethernet transceiver, suitable for communicating with the network 32 as appropriate or desired.

Other computer system designs and configurations may also be suitable to implement the systems and methods described herein. The following examples illustrate various implementations in accordance with one or more aspects of the disclosure.

Example 1 is a method comprising: obtaining, by a processor device, at least one performance metric value that quantifies a performance metric of a first computing device; determining, by the processor device, that the at least one performance metric value has an undesirable value; and causing the initiation of a live migration of a process executing on the first computing device to a second computing device based on determining that the at least one performance metric value has the undesirable value.

Example 2 is the method of example 1 further comprising: subsequent to determining that the at least one performance metric value has the undesirable value and prior to causing the initiation of the live migration of the process, obtaining performance metric values that quantify performance metrics of the second computing device; and selecting, based at least in part on the performance metric values that quantify performance metrics of the second computing device, the second computing device for the live migration of the process executing on the first computing device.

Example 3 is the method of example 1 wherein obtaining, by the processor device, the at least one performance metric value comprises: iteratively, over a period of time, obtaining a performance metric value that quantifies the performance metric of the first computing device, each performance metric value being based on a more recent measurement than an immediately preceding performance metric value; and for each iteration, comparing the performance metric value to a predetermined threshold value.

Example 4 is the method of example 3 wherein the period of time is one second or less.

Example 5 is the method of example 1 wherein the at least one performance metric comprises a data transfer rate of data being communicated from a first electronic component to a second electronic component.

Example 6 is the method of example 5 wherein the first electronic component comprises the first computing device and the second electronic component comprises a storage device.

Example 7 is the method of example 5 wherein the first electronic component comprises a processor device of the first computing device and the second electronic component comprises a memory of the first computing device.

Example 8 is the method of example 5 method wherein the first electronic component comprises a network transceiver of the first computing device and the second electronic component comprises a router with which the first computing device communicates via the network transceiver.

Example 9 is the method of example 5 wherein determining, by the processor device, that the at least one performance metric value that quantifies the performance metric of the first computing device has an undesirable value comprises: comparing the at least one performance metric value to a predetermined threshold value; and determining, based on comparing the at least one performance metric value to the predetermined threshold value, that the at least one performance metric value is an undesirable value.

Example 10 is the method of example 1 wherein the at least one performance metric value comprises a value that quantifies a number of faults of an electronic component of the first computing device that have occurred over a period of time.

Example 11 is the method of claim 10 wherein determining, by the processor device, that the at least one performance metric value of the first computing device has an undesirable value comprises: determining an age of the electronic component; determining a predetermined threshold value that is based on the age of the electronic component; comparing the at least one performance metric value to the predetermined threshold value; and determining, based on comparing the at least one performance metric value to the predetermined threshold value, that the at least one performance metric value is an undesirable value.

Example 12 is the method of example 1 further comprising: obtaining, by a processor device, at least one performance metric value that quantifies a performance metric of a third computing device; determining, by the processor device, that the at least one performance metric value of the third computing device has an undesirable value; determining that the third computing device is experiencing a security attack; and in response to determining that the second computing device is experiencing the security attack, making a determination not to initiate a live migration of the process executing on the third computing device.

Example 13 is a computing device, comprising: a memory and a processor device coupled to the memory to: obtain at least one performance metric value that quantifies a performance metric of a first computing device; determine that the at least one performance metric value has an undesirable value; and cause the initiation of a live migration of a process executing on the first computing device to a second computing device based on determining that the at least one performance metric value has the undesirable value.

Example 14 is the computing device of example 13 wherein the processor device is further to: subsequent to determining that the at least one performance metric value has the undesirable value and prior to causing the initiation of the live migration of the process, obtain performance metric values that quantify performance metrics of the second computing device; and select, based at least in part on the performance metric values that quantify performance metrics of the second computing device, the second computing device for the live migration of the process executing on the first computing device.

Example 15 is the computing device of example 13 wherein to obtain the at least one performance metric value, the processor device is further to: iteratively, over a period of time, obtain a performance metric value that quantifies the performance metric of the first computing device, each performance metric value being based on a more recent measurement than an immediately preceding performance metric value; and for each iteration, compare the performance metric value to a predetermined threshold value.

Example 16 is the computing device of example 13 wherein the processor device is further to: obtain at least one performance metric value that quantifies a performance metric of a third computing device; determine that the at least one performance metric value of the third computing device has an undesirable value; determine that the third computing device is experiencing a security attack; and in response to determining that the second computing device is experiencing the security attack, make a determination not to initiate a live migration of the process executing on the third computing device.

Example 17 is a computer program product stored on a non-transitory computer-readable storage medium and including instructions to cause a processor device to: obtain at least one performance metric value that quantifies a performance metric of a first computing device; determine that the at least one performance metric value has an undesirable value; and cause the initiation of a live migration of a process executing on the first computing device to a second computing device based on determining that the at least one performance metric value has the undesirable value.

Example 18 is the computer program product of example 17 wherein the instructions further cause the processor device to: subsequent to determining that the at least one performance metric value has the undesirable value and prior to causing the initiation of the live migration of the process, obtain performance metric values that quantify performance metrics of the second computing device; and select, based at least in part on the performance metric values that quantify performance metrics of the second computing device, the second computing device for the live migration of the process executing on the first computing device.

Example 19 is the computer program product of example 17 wherein to obtain the at least one performance metric value, the instructions further cause the processor device to: iteratively, over a period of time, obtain a performance metric value that quantifies the performance metric of the first computing device, each performance metric value being based on a more recent measurement than an immediately preceding performance metric value; and for each iteration, compare the performance metric value to a predetermined threshold value.

Individuals will recognize improvements and modifications to the preferred examples of the disclosure. All such improvements and modifications are considered within the scope of the concepts disclosed herein and the claims that follow.

What is claimed is:

1. A method comprising:
    making a determination, by a processor device, to cause an initiation of a live migration of a first process executing on a first computing device to a second computing device;
    subsequent to making the determination and prior to causing the initiation of the live migration of the first process, determining, by the processor device, that the first computing device is undergoing an electronic security attack; and
    in response to determining that the first computing device is undergoing the electronic security attack, causing the initiation of the live migration of the first process or reversing the determination to cause the initiation of the live migration of the first process based on the electronic security attack.

2. The method of claim 1 wherein causing the initiation of the live migration or reversing the determination to cause the initiation of the live migration further comprises:
    determining, by the processor device, that an originator of the electronic security attack is located outside of a network gateway device; and based on determining that the originator of the electronic security attack is located in an external network, reversing the determination to cause the initiation of the live migration.

3. The method of claim 2 further comprising:
determining that at least one performance metric value of the first computing device has an undesirable value; and
wherein the determination to cause the initiation of the live migration is based on determining that the at least one performance metric value of the first computing device has the undesirable value.

4. The method of claim 3 further comprising:
wherein the at least one performance metric value quantifies a data transfer rate of data being communicated from a first electronic component of the first computing device to a second electronic component; and
making a determination that the electronic security attack is associated with the at least one performance metric value having the undesirable value.

5. The method of claim 4 wherein the first electronic component comprises the first computing device and the second electronic component comprises a storage device.

6. The method of claim 4 wherein the first electronic component comprises a processor device of the first computing device and the second electronic component comprises a memory of the first computing device.

7. The method of claim 4 wherein the first electronic component comprises a network transceiver of the first computing device and the second electronic component comprises a router with which the first computing device communicates via the network transceiver.

8. The method of claim 4 wherein determining, by the processor device, that the at least one performance metric value that quantifies the data transfer rate has an undesirable value comprises:
comparing the at least one performance metric value to a predetermined threshold value; and
determining, based on comparing the at least one performance metric value to the predetermined threshold value, that the at least one performance metric value is an undesirable value.

9. The method of claim 2 further comprising causing the network gateway device to refuse subsequent communications from the originator.

10. The method of claim 1 wherein causing the initiation of the live migration or reversing the determination to cause the initiation of the live migration further comprises:
determining, by the processor device, that an originator of the electronic security attack is located outside of a network gateway device;
determining, by the processor device, that the second computing device is not undergoing an electronic security attack; and
in response to determining that the second computing device is not undergoing the electronic security attack, causing the initiation of the live migration of the first process from the first computing device to the second computing device.

11. The method of claim 1 wherein causing the initiation of the live migration or reversing the determination to cause the initiation of the live migration further comprises:
determining, by the processor device, that the electronic security attack is originating from the first computing device; and
based on determining that the security attack is originating from the first computing device, causing the initiation of the live migration of the first process from the first computing device to the second computing device.

12. The method of claim 11 further comprising:
determining that the electronic security attack is caused by a second process and not the first process.

13. The method of claim 11 further comprising:
determining, by the processor device, that the second computing device is not undergoing an electronic security attack prior to causing the initiation of the live migration of the first process from the first computing device to the second computing device.

14. The method of claim 1 wherein causing the initiation of the live migration or reversing the determination to cause the initiation of the live migration further comprises:
determining, by the processor device, that the electronic security attack is originating from the first computing device; and
based on determining that the electronic security attack is originating from the first computing device, reversing the determination to cause the initiation of the live migration.

15. The method of claim 14 further comprising:
determining that the electronic security attack is caused by the first process.

16. A computing device, comprising:
a memory; and
a processor device coupled to the memory to:
make a determination to cause an initiation of a live migration of a first process executing on a first computing device to a second computing device;
subsequent to making the determination and prior to causing the initiation of the live migration of the first process, determine that the first computing device is undergoing an electronic security attack; and
in response to determining that the first computing device is undergoing the electronic security attack, cause the initiation of the live migration of the first process or reverse the determination to cause the initiation of the live migration of the first process based on the electronic security attack.

17. The computing device of claim 16 wherein to cause the initiation of the live migration or reverse the determination to cause the initiation of the live migration, the processor device is further to:
determine that an originator of the electronic security attack is located outside of a network gateway device; and
based on determining that the originator of the electronic security attack is located in an external network, reverse the determination to cause the initiation of the live migration.

18. The computing device of claim 16 wherein to cause the initiation of the live migration or reverse the determination to cause the initiation of the live migration, the processor device is further to:
determine that the electronic security attack is originating from the first computing device; and
based on determining that the security attack is originating from the first computing device, cause the initiation of the live migration of the first process from the first computing device to the second computing device.

19. A computer program product stored on a non-transitory computer-readable storage medium and including instructions to cause a processor device to:
make a determination to cause an initiation of a live migration of a first process executing on a first computing device to a second computing device;

subsequent to making the determination and prior to causing the initiation of the live migration of the first process, determine that the first computing device is undergoing an electronic security attack; and in response to determining that the first computing device is undergoing the electronic security attack, cause the initiation of the live migration of the first process or reverse the determination to cause the initiation of the live migration of the first process based on the electronic security attack.

20. The computer program product of claim 19, wherein to cause the initiation of the live migration or reverse the determination to cause the initiation of the live migration, the instructions further cause the processor device to:

determine that an originator of the electronic security attack is located outside of a network gateway device; and based on determining that the originator of the electronic security attack is located in an external network, reverse the determination to cause the initiation of the live migration.

\* \* \* \* \*